(12) United States Patent
Kugai

(10) Patent No.: US 7,464,273 B2
(45) Date of Patent: Dec. 9, 2008

(54) CONTENT UTILIZING METHOD

(75) Inventor: Masami Kugai, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 615 days.

(21) Appl. No.: 10/699,990

(22) Filed: Nov. 3, 2003

(65) Prior Publication Data

US 2004/0133785 A1 Jul. 8, 2004

(30) Foreign Application Priority Data

Nov. 7, 2002 (JP) .............................. 2002-324169

(51) Int. Cl.
*H04K 1/00* (2006.01)
*G06F 15/00* (2006.01)

(52) U.S. Cl. ............................. 713/189; 726/26; 705/51

(58) Field of Classification Search ................. 713/189; 380/200–242; 705/51–59, 75–79; 726/26–33
See application file for complete search history.

(56) References Cited

U.S. PATENT DOCUMENTS

| | | | | |
|---|---|---|---|---|
| 5,629,980 | A * | 5/1997 | Stefik et al. .................... | 705/54 |
| 5,892,900 | A * | 4/1999 | Ginter et al. ................... | 726/26 |
| 6,105,072 | A * | 8/2000 | Fischer ........................ | 719/315 |
| 6,119,229 | A * | 9/2000 | Martinez et al. ............... | 726/28 |
| 6,351,815 | B1 * | 2/2002 | Adams ......................... | 726/32 |
| 6,577,735 | B1 * | 6/2003 | Bharat ......................... | 380/286 |
| 6,799,271 | B2 * | 9/2004 | Kugai .......................... | 713/168 |
| 7,017,189 | B1 * | 3/2006 | DeMello et al. ................ | 726/26 |
| 7,131,144 | B2 * | 10/2006 | Rabin et al. ................... | 726/30 |
| 2002/0032725 | A1 * | 3/2002 | Araujo et al. ................. | 709/203 |
| 2003/0056114 | A1 * | 3/2003 | Goland ........................ | 713/201 |
| 2004/0255140 | A1 * | 12/2004 | Margolus et al. ............. | 713/193 |

\* cited by examiner

*Primary Examiner*—Hadi Armouche
(74) *Attorney, Agent, or Firm*—Cowan, Liebowitz & Latman, P.C.

(57) ABSTRACT

The content utilizing method includes the steps of encrypting the encrypted requested content with a predetermined encrypting key and transmitted to a content processing apparatus, generating and transmitting license control information including usage right information having identification information, and condition of use of the selected content and user specific information together with a decrypting key corresponding to the encrypting key to a usage right control server controlling the usage right of the content. If the utilizing authorization of the content is verified, the usage right information and the decrypting key are transmitted from the authorizing server to the content processing apparatus, and the content is decrypted by the decrypting key in the content processing apparatus and the decrypted content is processed based on the usage right information. In this manner an arbitrary content distribution is enabled to protect the content by a copyright protection without requiring a special recording media.

14 Claims, 8 Drawing Sheets

ACCOUNT MENU

301 → CONTENT ID: gdoc023655
302 → CONTENT NAME: OPINION TO FOLK STORY

RIGHT TO USE
___

303 → ☐ PRINT    ○ BLACK AND WHITE    ⦿ COLOR

304 → ☐ <CHARGE/ACTUAL CHARGE TYPE>

| | | |
|---|---|---|
| BASIC CHARGE | 300 | YEN — 309 |
| PRINTING CHARGE PER A TIME | 1200 | YEN — 310 |

305 → ☐ <CHARGE/PREPAYMENT TYPE>

| | TIMES | PREPAID CHARGE | |
|---|---|---|---|
| 306 → ☐ A | 2 | 2000 | YEN — 311 |
| 307 → ☐ B | 10 | 9000 | YEN — 312 |

308 → [ OTHERS ]
___

PASSWORD [ ] ← 313

( OK )    ( CANCEL )
  314        315

401:
```
<head>
  <content>
    <id>gdoc0236655</id>
    <name>OPINION TO FOLK STORY </name>
    <person>
      <id>rich0087067</id>
      <name>Masaya Urashima</name>
      <address>102, Sakura-cho, Yamazato-ku, Ohyama-shi, kanagawa 234-0025</address>
      <e-mail>umasaya@abc.ne.jp</e-mail>
      <homepage>http://www.abc.ne.jp/umasaya/index.html</homepage>
      <public-key url="http://www.abc.ne.jp/umasaya/key/public_key.dat"></public-key>
    </person>
    <copy-right>Copyright1990Masaya Urashima</copy-right>
    <abstract>The fact of matter is that the Ryuou palace to which URASHIMA TARO went is an alient world. </abstract>
  </content>
```

402:
```
  <licenser>
    <id>LABO3500230</id>
    <name>Nippon Archaeology Research Institution.Corp.</name>
    <address>Mukashimai-machi 53, Ohhara-Word, Kawasaki-City, Kanagawa-pref. 242-00005</address>
    <e-mail>koukoken@qoodoo.co.jp</e-mail>
    <homepage>http://www.koukoken.co.jp/</homepage>
    <public-key url="http://www.koukoken.co.jp/key/key_dat"></public-key>
  </licenser>
```

403:
```
  <licensee>
    <id>KAD2300835</id>
    <name>Kokishin Yorozuya</name>
    <address>Tonden-machi 53, Kohara-Word, Kawasaki-City,Kanagawa-pref. 211-0001</address>
    <e-mail>ykouki@geocities.co.jp</e-mail>
    <homepage>http://geocities.co.jp/Kawasaki/105/</homepage>
    <public-key url="http://www.geocities.co.jp/Kawasaki/105/"></public-key>
  </licensee>
```

404:
```
  <play player="display S-VGA">
    <fee rate="98">
      <prepaid time-unit="30days" fee="600">
        <fee rate="98">
          <metered time-unit="1hours" basic="0" use="1" max="5000">
            <discount>
              <accumulation use="720" rate="90" reputation="yes">
              </accumulation>
            </discount>
          </metered>
        </fee>
      </prepaid>
    </fee>
  </play>
```

405:
```
  <print quality="color">
    <fee>
      <prepaid count-unit="2" fee="2000">
      </prepaid>
    </fee>
  </print>
```

406:
```
  <copy>
    <next-copy-rights>
      <delete><copy/><print/></delete>
    </next-copy-rights>
    <incentive rate="102">
      <metered count-unit="1" basic="0" use="10">
        <extra>
          <accumulation use="100" rate="105" reputation="yes">
          </accumulation>
        </extra>
      </metered>
    </incentive>
  </copy>
  </body>
</usage-rights>
```

CONTENT UTILIZING METHOD

BACKGROUND OF THE INVENTION

1. Field of the Invention

The present invention relates to a content utilizing method, and more particularly to a method for copyright protection and usage control of a content when utilizing digital content on the Internet.

2. Related Background Art

Recently, because of increasing popularity of the Internet, a sales business of network distribution of digital contents has been attracting attention. However, there have been increasing concerns that the digital contents are illegally utilized without payment to copyright owners.

For this reason, a technology for protecting the copyright has been proposed, utilizing the technology of encryption and authorization, such as MagicGate® of Sony. However, such technology has to utilize a special recording medium having the functions of encrypting and authorization, such as a memory stick. Also, such method cannot be used for exploiting the convenience of a copy distribution of digital contents.

Also, in the conventional content sales, the user pays a price for the content itself, and such price is constant regardless of an amount of usage of the content. As a result, such method has been unreasonable for users with a low amount of usage.

SUMMARY OF THE INVENTION

In consideration of the foregoing, an object of the present invention is to enable content distribution freely without requiring a special recording medium, while achieving protection of the copyright.

Another object of the present invention is to enable a payment of a price according to an amount of usage of content by the user.

According to one aspect, the present invention which achieves these objectives relates to a content utilizing method in a system including a user terminal, a content server for providing a content, a content processing apparatus for processing a content, and a usage right controlling server for controlling a right of use of the content, the method including a use requesting step of selecting a content to be used and a condition of use therefore in the user terminal and requesting the use of such content to the content server, a content transmitting step of encrypting the content with a predetermined encrypting key in the content server and transmitting the content to the content processing apparatus, a license control information transmitting step of generating, in the content server, license control information including usage right information having identification information and condition of use of the selected content and user specific information, and transmitting it together with a decrypting key corresponding to the encrypting key to the usage right control server, a ticket transmitting step of generating, in the content server, a ticket including an identifier of the license control information and transmitting it to the content processing apparatus, an authorization step of transmitting the identifier of the license control information from the content processing apparatus to the usage right control server, which communicates with the content processing apparatus based on the user specific information in the license control information corresponding to the identifier, thereby verifying an authorization for use of the user, a usage right information transmitting step of transmitting the usage right information and the decrypting key from the authorizing server to the content processing apparatus, and a content processing step of decrypting the content by the decrypting key in the content processing apparatus and processing the decrypted content based on the usage right information.

Other objectives and advantages besides those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

FIG. 3 is a view showing an example of a content trading menu image;

FIG. 4 is a view showing an example of a usage right script;

DESCRIPTION OF THE PREFERRED EMBODIMENTS

Figure 1:
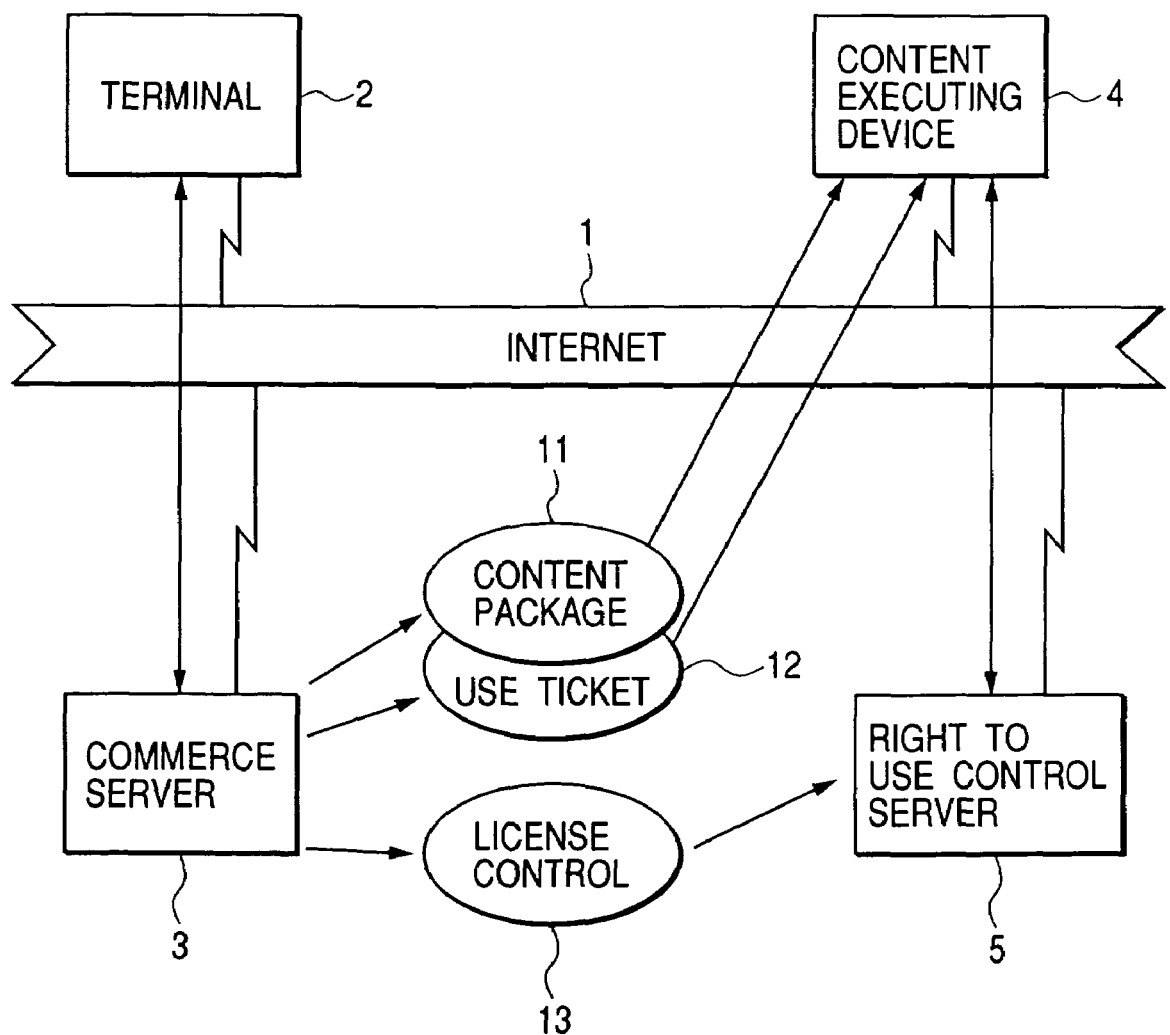
FIG. 1 is a block diagram showing the configuration of an entire content distribution system in a first embodiment.

In the following, a preferred embodiment of the present invention will be explained with reference to accompanying drawings.

At first, an outline of the embodiment of the present invention will be explained. A user wishing to purchase a content accesses a commerce server of contents, and, upon finding an interesting content, selects one of conditions of use proposed by a licensor of the content. Based on the selected condition of use, a usage right (right to use) script is generated, represented by a usage right (right to use) language.

The content is encrypted with a first encrypting key, and becomes a program including content information (for example a Java® applet format, hereinafter referred to as a content package). Then a license control, including such content information, a second encrypting key and the aforementioned usage right script, is prepared by license control preparation means. Also, use ticket generation means generates a use ticket including license control information and the second encrypting key. In a case where the user of the content has a third encrypting key (secret key of a public key encryption system) in advance, the use ticket need not include the second encrypting key. Such license control information is used to specify the aforementioned prepared license control.

The user downloads the content package and the use ticket to a specified PC or a specified digital composite equipment. The PC or the digital composite equipment in which the content packet is placed will hereinafter be called a content executing device.

The license control is transferred from the commerce server to the usage right control server, but it remains in the commerce server in case the commerce server also functions as the usage right control server. The server in which the license control is placed will hereinafter be called a usage right (right to use) control server (or UCS: usage control server).

When the user executes the content package in the content executing device, the content package reads the license control information in the use ticket, and transfers it to the usage right control server. The usage right control server specifies a license control corresponding to the license control information among a license control database managed by the UCS.

Then authorization data are prepared by encrypting the user information contained in the license control, the content information and a random number with the second encrypting key. The usage right control server transmits such authorization data to the content executing device, and the content package transmits decrypted data, obtained by decrypting the authorization data by the second encrypting key contained in the use ticket or by the third encrypting key entered by the user, to the usage right control server. The usage right control server checks whether the decrypted data coincide with the data prior to the encryption, and, in case the authorization is successful, transmits a usage right script and the first encrypting key to the content executing device. The content package decrypts the content with the first encrypting key according to the condition of use of the usage right script, and then executes a printing, a display or a playing.

The above-explained process for verifying the right of use after the license control is specified may also be executed in a following manner. The UCS generates a random number and transmits the random number to the content executing device. The content executing device encrypts the random number with the second encrypting key or the third encrypting key entered by the user thereby preparing authorization data. The content package transmits such authorization data to the UCS. The UCS decrypts such authorization data with the second encrypting key contained in the license control and verifies the authorization by checking whether the decrypted data coincide with the transmitted random number.

First Embodiment

FIG. 1 is a block diagram showing an entire configuration of a content distribution system of the present embodiment.

A client PC (terminal) 2 used by the user is connected to an Internet protocol 1 with a protocol such as HTTP (Hypertext Transfer Protocol), FTP (File Transfer Protocol), POP3 (Post Office Protocol 3) or SMTP (Simple Mail Transfer Protocol). A content commerce server 3, having a content for sale, is also connected to the Internet 1.

A content executing device 4 comprises a PC or a network-adaptable digital copying machine, for executing a display or a copy of the content. The content executing device 4 has a software necessary for connection to the Internet 1 (for example an OS (Operating System), various internet protocols, SSL (Secure Sockets Layer), or www browser), and a Java® VM environment.

A usage right control server 5 controls a right of use of the content for the user and is also connected to the Internet 1. The content executing device 4 and the usage right control server 5 may be part of a single server having both functions.

A content package 11, a use ticket 12 and a license control 13 are respectively data handled in the system. Details of these data will be explained later.

Figure 2:
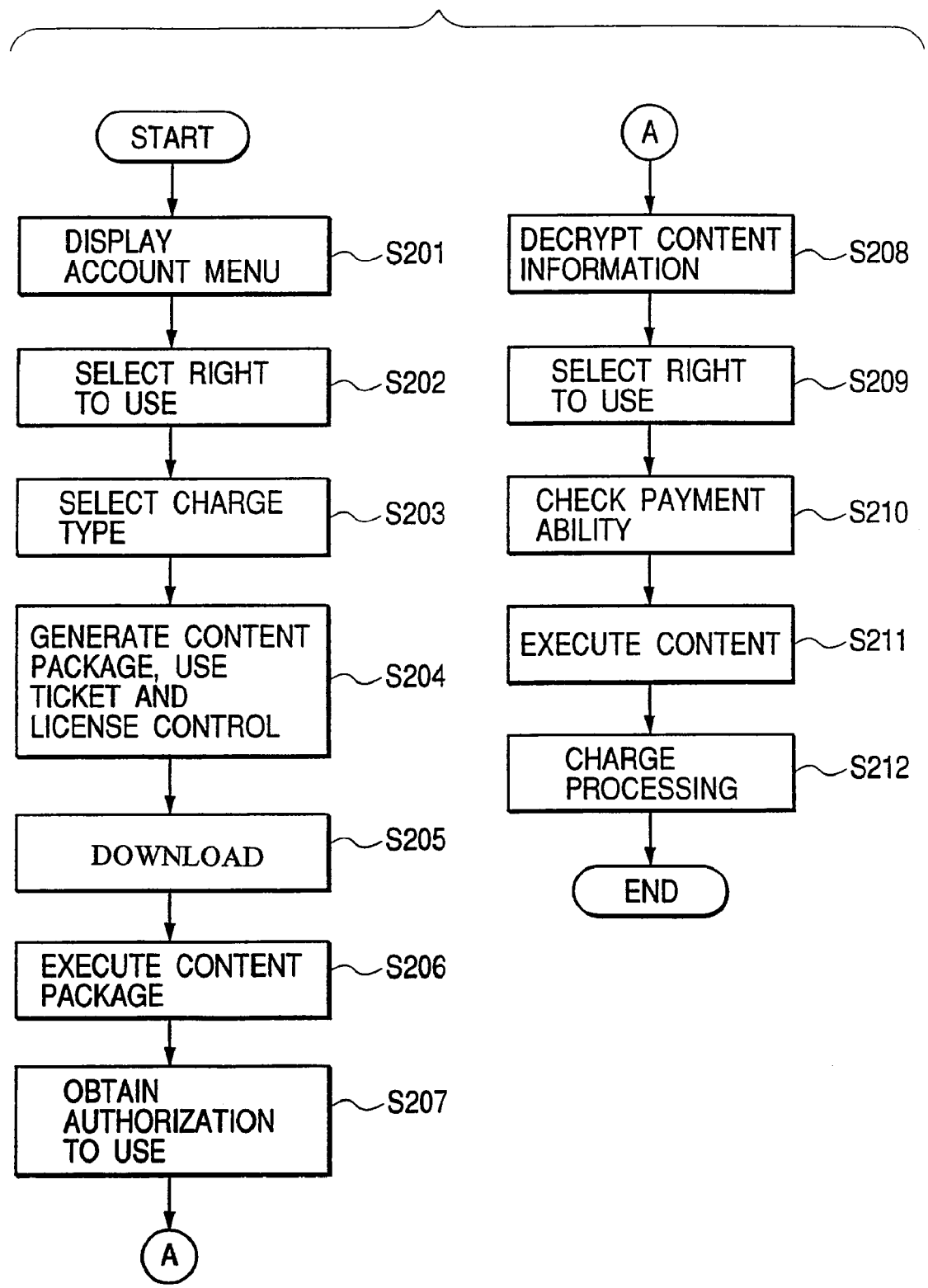
FIG. 2 is a flow chart showing a content distributing procedure in the first embodiment.

In the following, a content distributing protocol of the present embodiment will be explained with reference to a flow chart shown in FIG. 2. FIG. 2 shows a process from a purchase of a content by the user to a charging of a fee.

At first, the user executes an access from its terminal 2 to the content commerce server 3 utilizing a web browser such as NETSCAPE navigator, and, upon finding a desired content, provides an instruction for a purchase. Then, in a step S201, the content commerce server 3 displays an account menu of the content on the web browser of a display of the user terminal 2.

FIG. 3 shows a displayed image of the content account menu. An account menu image 300 shows a content ID 301, a content name 302, selectable rights of use and charging methods thereof. In FIG. 3, a "printing" right (authorization) 303 only is displayed as the usage right, but there may also be displayed a "display" right, a "copy" right, etc.

Also in FIG. 3, the printing provides options for black-and-white and color printing, and charges corresponding to the selected option are displayed in charge displaying columns 309-312. Each of check boxes 303-307 displays a check mark "V" upon selection of a corresponding item.

The user selects "printing" 303 and then selects either "black and white" or "color" (step S202). In this example, it is assumed that "color" is selected.

Then the user selects, for the charging method, either an "actual charge type" 304 or a "prepaid type" 305. For the actual charge type 304, there will be charged a basic printing fee (charged regardless whether the content is used or not), or 300 Yen, and a fee of 1200 Yen for each printing. In the prepaid type 305, there is further selected a pre-payment for two printings (check box (A) 306) or a pre-payment for ten printings (check box (B) 307).

If the check box (A) 306 is selected, there will be a charge in the amount of 2000 Yen as a fee for the two printings, and, if the check box (B) 307 is selected, there will be a charge in the amount of 9000 Yen as a fee for the ten printings.

Also by clicking "others" button 308 with a mouse, the display shifts to an image (not shown) for selecting prepaid charges for numbers of printings other than the check box (A) 306 and check box (B) 307, whereby the user is allowed to select other numbers of printing.

In a step S203, the user selects the charging type as explained above, and enters a password specific to the user (hereinafter referred to as user key) in a password input column 313. Then an OK button 314 is clicked, whereupon the information entered in the account menu image is transmitted to the content commerce server 3. Between the terminal 2 and the content commerce server, a secure communication is established by a protocol such as SSL. On the other hand, if a cancel button 315 is depressed, the entered information is canceled and the display returns to a state for reentry.

The content commerce server 3, upon receiving the information designated by the user in the account menu image 300, executes following three processes (step S204). Firstly, it encrypts data of the content to generate a content package 11. Secondly, it generates a license control 13 including a usage right script (hereinafter abbreviated as URS). Thirdly, it generates a use ticket 12.

The data of the content are encrypted by a public key encryption system such as DES (Data Encryption Standard), utilizing an encryption key (called content key). The content key may be determined in advance, or prepared for each content, each account or each user.

The content package 11 is a Java® applet with program codes to be explained later. The content package 11 also includes content information such as a content ID and a content name.

When the user selects necessary items in the account menu image 300, a URS described in the XML (Extensible Markup Language) language based on the selected information. FIG. 4 shows an example 400 of the URS. Also, FIG. 5 shows a structure of the URS.

Figure 5:
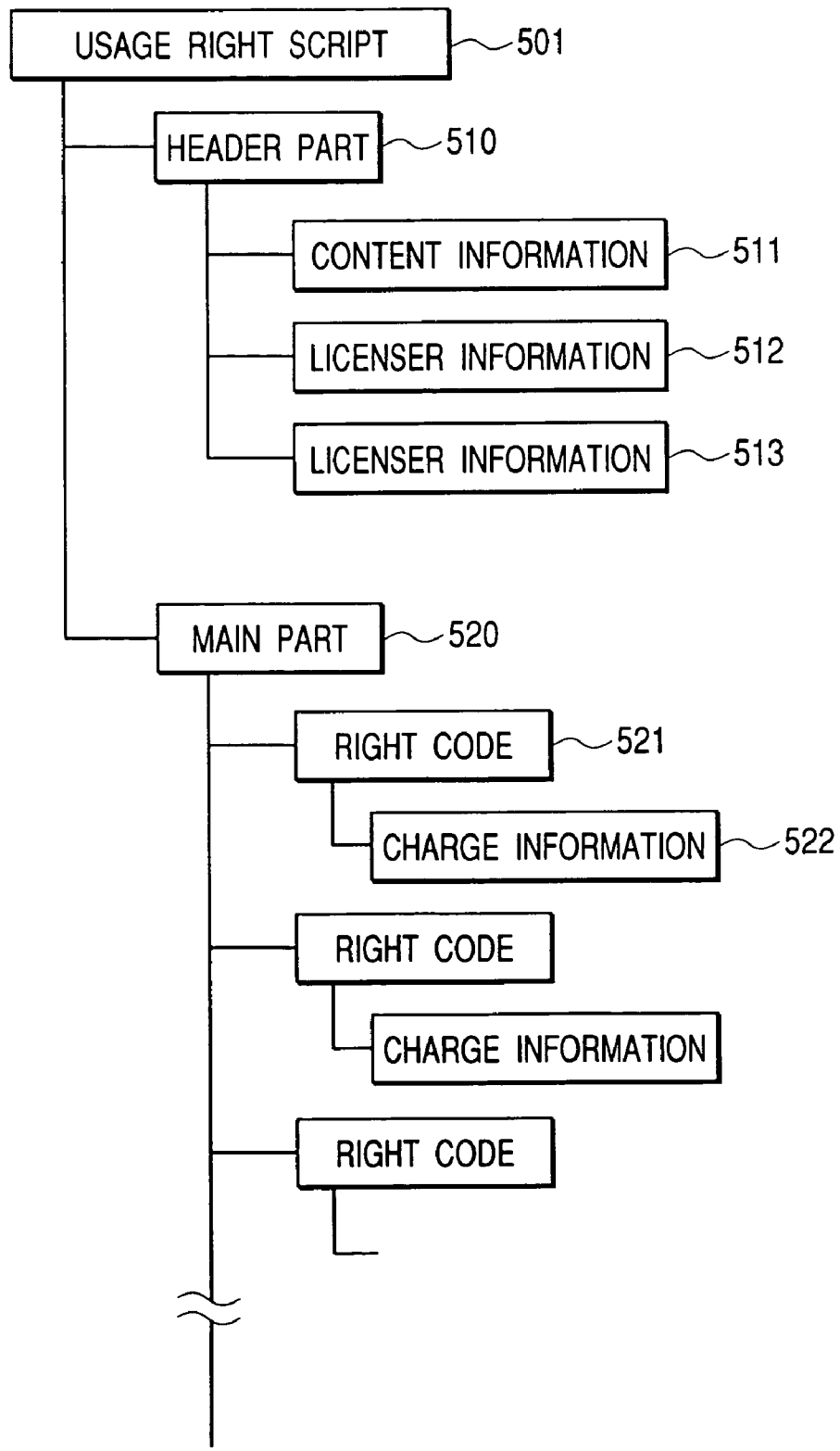
FIG. 5 is a view showing an example of a structure of a usage right script.

In FIG. 5, information 501, 510 to 513, 520 to 522 are all text data each sandwiched with XML tags. For example, content information 511 is sandwiched between content tags and has a form of <content> to </content>. The URS has a hierarchic structure, and a description of a lower block is sandwiched between the tags of an upper block.

A header part 510 indicates the entire script, and contains content information 511, licensor (person licensing use of content) information 512, and licensee (person receiving license of use of content) information 513.

A main part 520 describes a condition of use, and includes an array of right codes 521. Charge information 522 describes information for charging in case the user (licensee) utilizes the right code 521.

The right codes include Play, Print, Copy, Transfer, Loan and Delete. Play is a right of executing a play such as display, play, game etc. of the content; Print is a right to print the content; Copy is a right to distribute a copy of the content to a third person; Transfer is a right of transferring the content to a third person; Loan is a right of temporarily lending the content to a third person; and Delete is a right of erasing the content and receiving a payback.

A URS sample 400 shown in FIG. 4 includes descriptions of content information 401, licensor information 402, licensee information 403, a play (display) right code 404, a print right code 405, and a copyright code (right code for copy distribution of content right) 406. The print right code 405 describes that a color printing is possible and that 2000 Yen are charged for two printings.

The license control 13 includes the user key entered in the password input column 313 of the account menu image 300, the URS 400, content information and a license control ID. Since the URS 400 contains the user ID and the content ID, it is to be noted that the user ID and the content ID are contained in the license control 13. The license control ID is an ID number uniquely given to the license control 13.

In the step S204, a use ticket 12 is also generated. The use ticket 12 memorizes the user key and the license control ID mentioned above.

Then a step S205 downloads necessary files. The content package 11 and the use ticket 12 are downloaded from the content commerce server 3 to the content executing device 4 connected to the Internet 1 and managed by the user.

On the other hand, the license control 13 and the content key are transferred from the content commerce server 3 to the usage right control server 5 under the management of the seller (licensor) of the content. In case the usage right control server 5 is same as the content commerce server 3, the license control 13 remains in the content commerce server 3.

Figure 6:
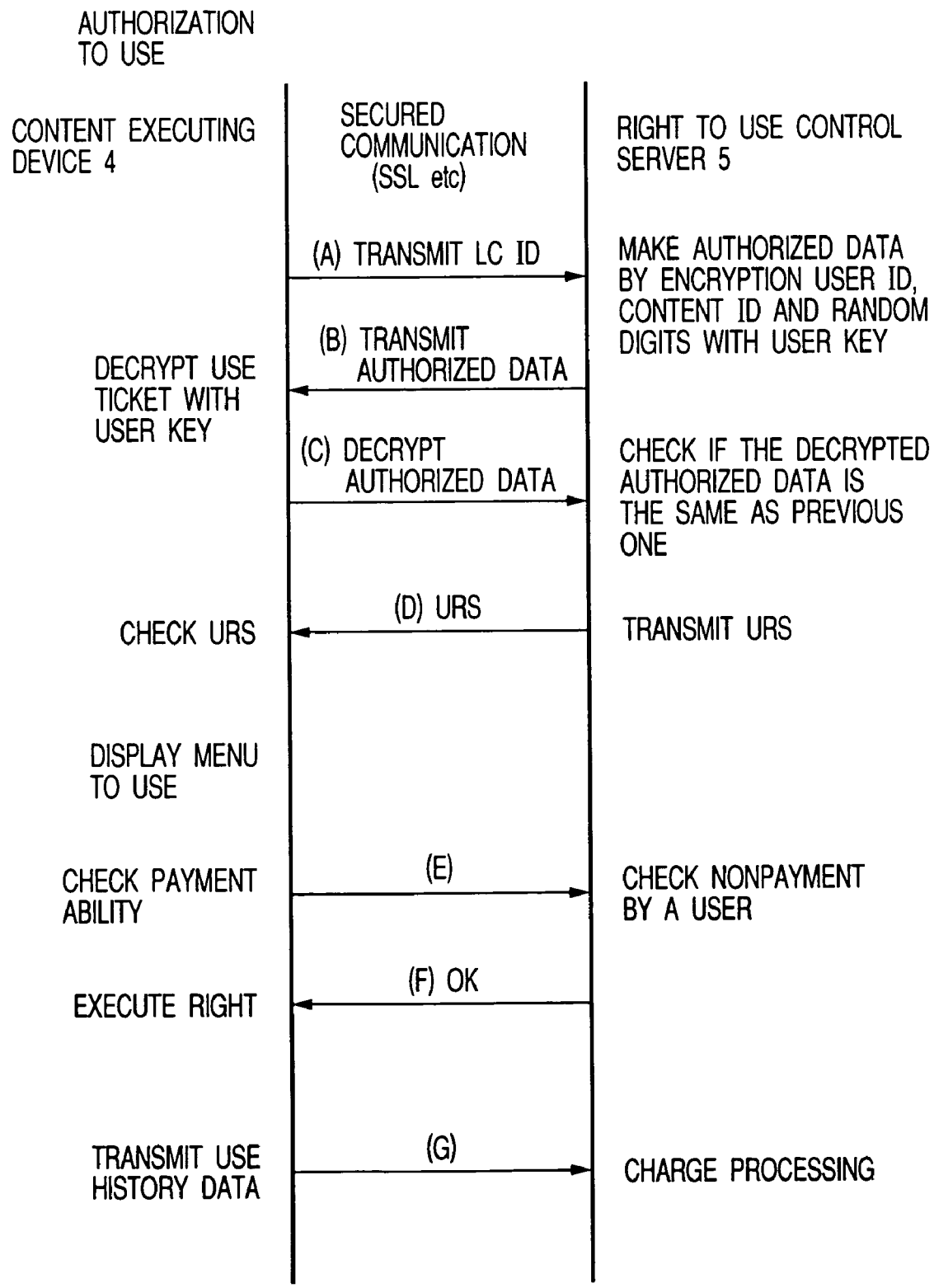
FIG. 6 is a view showing an authorizing protocol for a qualification for use in the first embodiment.

In a step S206, the user executes the content package 11 in the content executing device 4 under its management. Since the content package 11 is a Java® applet, it can be executed from the web browser. The content package 11 at first verifies an authorization of use, in order to confirm whether the user is a user who has properly purchased the content. A protocol of such use authorization verification is shown in FIG. 6.

The content package 11 establishes a secure communication session such as SSL with the usage right control server 5. Then it reads the use ticket 12 and acquires the license control ID. The content package 11 sends the license control ID to the usage right control server 5 and request a search of the license control 13 corresponding to the use ticket 12 (A in FIG. 6).

The usage right control server (USC) 5 manages, in a database, license controls of licenses purchased by many users. The usage right control server (USC) 5 searches the license control 13 corresponding to the license control ID, and generates a random number. It generates authorization data by encrypting data, formed by combining the user ID and the content ID contained in the license control 13 and the above-mentioned random number, with the user key. In the present embodiment, the user key is a password constituted of a character train.

The encryption, utilizing a designated character train as the key, can be executed by a known technology such as UNIX® Crypt program. Otherwise, a higher security can be obtained by an encryption method such RSA or PGP, utilizing the user key as a public of a public key encryption process.

The usage right control server (UCS) 5 transmits the authorization data to the content executing device 4, and requests a decryption of the authorization data (B in FIG. 6).

The content package 11 decrypts the authorization data with the user key in the use ticket 12. Otherwise, in case the authorization data are encrypted with a public key encryption method, the decryption is executed with secret key data managed by the user. In this case, an operation of entering the secret key is required. Then the decrypted authorization data are transmitted to the usage right control server (UCS) 5 and a checking is requested (C in FIG. 6).

The usage right control server (UCS) 5 checks whether the authorization data prior to the encryption and the decrypted authorization data transmitted from the content executing device 4 are mutually same. If not, it is judged that the user of the content executing device 4 does not have a proper authorization for use, then an authorization error is transmitted to the content executing device 4 and the process is terminated. If same, it is judged that the user of the content executing device 4 has a proper authorization for use, and the URS 400 in the license control 13 is transmitted to the content executing device 4 (D in FIG. 6).

The content executing device 4 checks whether the transmitted URS 400 belongs thereto by inspecting the user information. In case of no problem, a usage right menu based on the URS 400 is displayed on a display of the content executing device 4. Also the content is decrypted by the content key of the use ticket 12 (step S208). For example, in case of the URS 400 shown in FIG. 4, three rights of Play (display), Print and Copy are displayed on the usage right menu.

Figure 7:
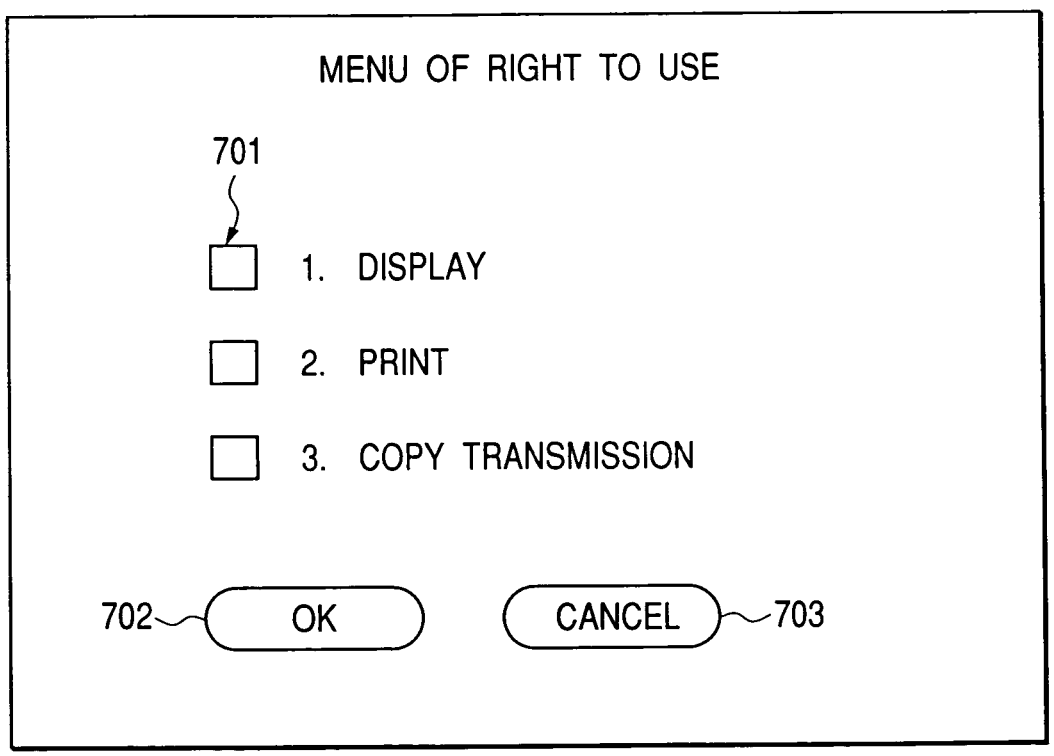
FIG. 7 is a view showing an example of a usage right menu.

FIG. 7 shows an example of the usage right menu. The usage right menu image 700 shown in FIG. 7 includes a check box 701 for selecting the right of use, an OK button 702 for executing the selected usage right, and a cancel button 703 for terminating the process.

The user selects a desired right among these rights (step S209). Let us consider a case, for example, of selecting Print (printing in FIG. 7). Since the Print is a prepaid charging method for two prints in the example shown in FIG. 4, the content package 11 sends a request to the usage right control server (UCS) 5 for checking whether the payment has been made and whether two printings have already been made (E in FIG. 6).

The usage right control server (UCS) 5 executes such checks and, in case of any problem, transmits a charging check error to the content executing device 4. Also, an OK is transmitted in case the charging check finds no problem (F in FIG. 6; step S210). The content package 11 terminates the process in case of receiving the charging check error.

The content package 11, upon receiving an OK, executes the Print right (step S211). When the execution is terminated in a normal manner, use history data are transmitted to request a charging process to the usage right control server (UCS) 5 (G in FIG. 6).

The usage right control server (UCS) 5 executes a corresponding charging to the licensee described in the license control 13 (step S212). The usage right control server (UCS) 5 has a memory area (credit account) for memorizing a credit to the licensee, and the charged amount is added to such credit account. Then the remaining sum of the account is requested to the licensee for example at the end of each month.

In the present example, since the prepaid charging method is adopted, the addition to the account is executed at the preparation (step S204) of the license control 13 (including the URS 400), and the step S212 executes a process of decreasing a remaining number available in the prepaid amount.

Also, in case of executing the right for which the actual charging method is selected, the step S212 adds a fee of the condition designated by the URS 400 to the credit account.

In the present embodiment, as explained in the foregoing, when the content commerce server 3 receives the information designated by the user according to the content of the account menu image 300 displayed on the terminal 2, the content package 11 and the use ticket 12 are downloaded from the content commerce server 3 to the content executing device 4, and the license control 13 is transferred from the content commerce server 3 to the usage right control server 5.

Then the usage right control server 5 utilizes the user key in the transferred license control 13 for encrypting the corresponding license control 13 thereby preparing authorization data, and sends it to the content executing device 4.

The content executing device 4 utilizes the user key in the use ticket 12 to decrypt the transmitted authorization data and sends it to the usage right control server 5. In case the authorization data prior to the encryption are same as the decrypted authorization data, the usage right control server 5 judges that the user of the content executing device 4 has an authorization for use, and transmits the usage right script 400 and the content key in the license control 13 to the license executing device 4.

The license executing device 4 checks the user information for confirming that the transmitted usage right script 400 belongs to it, and, in case there is no problem, displays a usage right menu 700 based on the usage right script 400 on the display of the content executing device 4 and decrypts the content by the transmitted content key.

In the above-described configuration, the content package 11, being encrypted, cannot be improperly utilized upon delivery.

In the event that the user gives the use ticket 12 to another third person, such third person may improperly use such use ticket 12. However, there should not be a major problem since the user usually manages the use ticket 12 confidentially as personal information of its own.

Second Embodiment

In the following, a second embodiment will be explained. The present embodiment is different from the first embodiment in the method of verifying the authorization for use. More specifically, the verification of the authorization for use in (A) to (D) in FIG. 6 is replaced by a method shown in FIG. 8. Therefore, an explanation will be given only to the verification of the authorization for use and other portions will not be explained.

Figure 8:
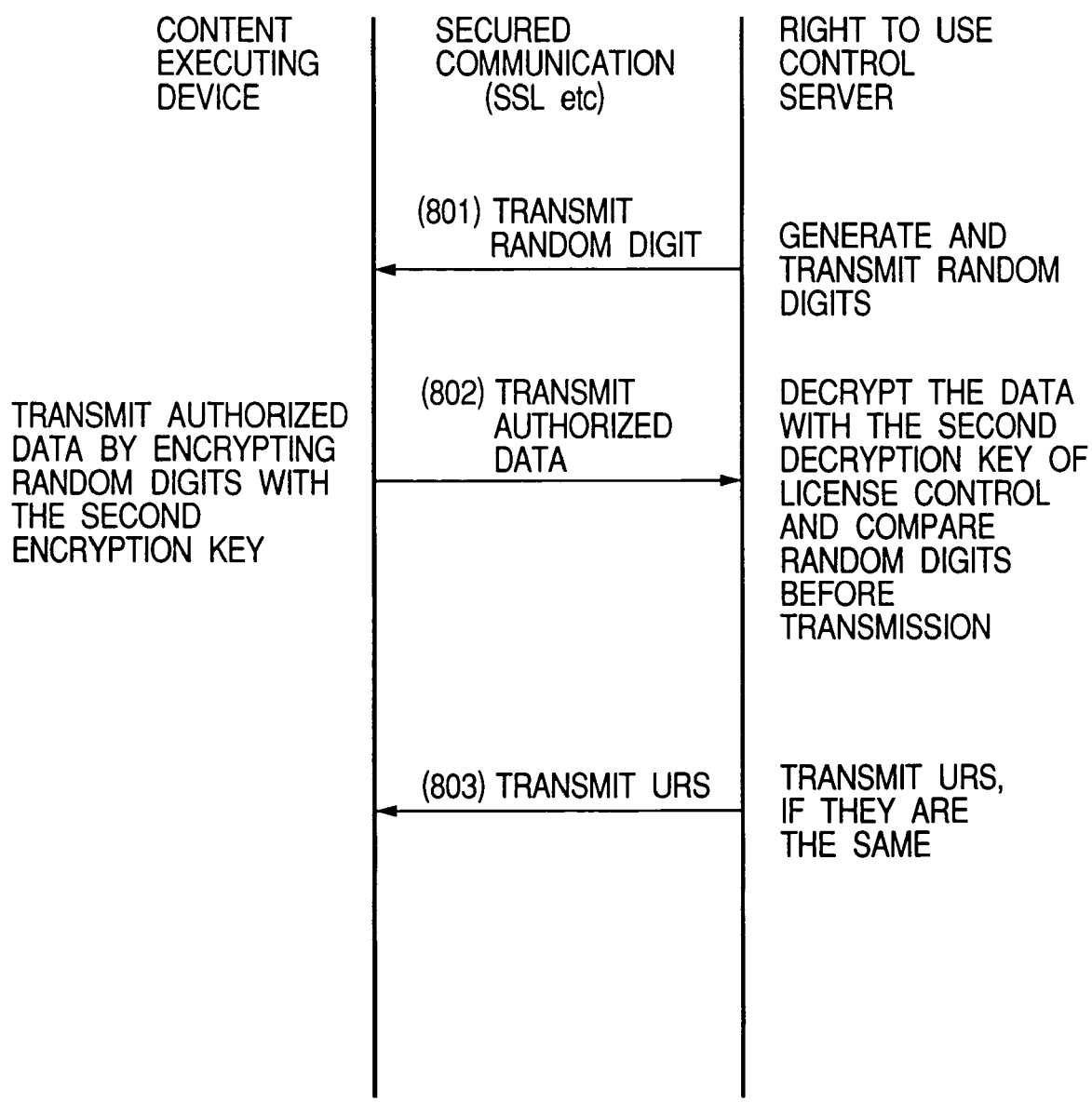
FIG. 8 is a view showing an authorizing protocol for a qualification for use in a second embodiment.

Referring to FIG. 8, the usage right control server (UCS) 5 generates a random number and transmits it to the content executing device (801). The content package 11 receives the random number and encrypts the random number with the second encrypting key or the third encrypting key (which is a secret key of the user in a public key encrypting system, in which case the second encrypting key becomes a public corresponding to such secret key) to prepare authorization data, and sends it to the usage right control server (UCS) 5 (802).

The usage right control server (UCS) 5 decrypts the received authorization data with the second encrypting key contained in the license control 13, and makes a comparison with the random number prior to the transmission. In case of coincidence, the authorization for use is confirmed and the URS is transmitted to the content executing device (803). On the other hand, in case of no coincidence, the authorization for use is considered absent, and for example a verification error is transmitted to the content executing device to terminate the process.

In the present embodiment, as explained in the foregoing, the authorization for use is verified by transmitting and receiving a random number between the usage right control server 5 and the content executing device 4 to achieve the verification of the authorization for use in an easy and secure manner.

The embodiments explained in the foregoing enable arbitrary delivery of the content package without employing a special recording medium, thereby allowing increased distribution of the contents. Also for the payment of the charge for the usage of the content, a charging method in which the user of the content makes a payment according to the number of uses can be employed.

The present invention may be applied to a system formed from plural equipment components (for example a main computer, an interface equipment, a display etc.) or to an apparatus constituted of a single equipment component, to an extent that the functions of the aforementioned embodiments can be realized.

The present invention also includes a configuration of supplying a computer in the apparatus or the system, connected with various devices for operating such devices so as to realize the functions of the aforementioned embodiments, with program codes of a software for realizing the functions of the aforementioned embodiments and the computer (or CPU (Central Processing Unit) or MPU (Micro Processing Unit)) of such system or apparatus operates the devices according to the supplied program. In such case, the program codes themselves read from a memory medium realize the functions of the aforementioned embodiments, and such program codes themselves, or means for supplying the computer with such program codes, for example a memory medium storing the program codes, constitutes the present invention.

The memory medium for supplying such program codes can be, for example, a floppy disk, a hard disk, an optical disk, a magnetooptical disk, a CD-ROM, a CD-R, a magnetic tape, a non-volatile memory card or a ROM.

Also the present invention naturally includes the program codes not only in a case where the computer executes the read program codes to realize the functions of the aforementioned embodiments, but also in a case where an OS (operating system) functioning on the computer or another application realizes the functions of the aforementioned embodiments under the instructions of such program codes.

Furthermore, the present invention includes a case where the program codes read from the memory medium are once stored in a memory provided in a function expansion board inserted in the computer or a function expansion unit connected to the computer, and a CPU or the like provided in such function expansion board or the function expansion unit executes all the actual processes or a part thereof thereby realizing the functions of the aforementioned embodiments.

In case the present invention is applied to the memory medium mentioned above, program codes corresponding to the foregoing flow charts can be stored in such memory medium.

Although the present invention has been described in its preferred form with a certain degree of particularity, many apparently widely different embodiments of the invention can be made without departing from the spirit and the scope thereof. It is to be understood that the invention is not limited to the specific embodiments thereof except as defined in the appended claims.

What is claimed is:

1. A content utilizing method in a system including a user terminal, a content server for providing a content, a content processing apparatus for processing a content, and a usage right control server for controlling a right of use of the content, the method comprising:
   a use requesting step of specifying a content to be used and a condition of use therefor in said user terminal and requesting a use of the specified content to said content server;
   a content package transmitting step of encrypting the specified content with a first encrypting key in said content server and transmitting a content package including the encrypted content and a license control assistant program to said content processing apparatus;
   a license control information transmitting step of generating, in said content server, license control information including the license identifier, usage right information having the specified condition of use and a content identifier of the specified content, and a second encrypting key, and executing transmission together with a decrypting key corresponding to the first encrypting key to said usage right control server;
   a ticket transmitting step of generating, in said content server, a ticket including the license identifier and a second decrypting key corresponding to the second encrypting key and transmitting the ticket to said content processing apparatus;
   an execution step of executing, in said content processing apparatus, the license control assistant program included in the content packet for extracting the license identifier from the ticket and for transmitting the license identifier from said content processing apparatus to said usage right control server, and
   an authorization step of verifying, in said usage right control server, an authorization for use of the user by communicating with the license control assistant program executed in said content processing apparatus using the second encrypting key contained in the license control information corresponding to the transmitted license identifier;
   a usage right information transmitting step of transmitting, after the authorization is verified, the usage right information and the first decrypting key from said authorizing server to said content processing apparatus; and
   a content processing step of decrypting the encrypted content by the first decrypting key in said content processing apparatus and processing the decrypted content based on the usage right information.

2. A content utilizing method according to claim 1, wherein said authorization step includes:
   an authorization data transmitting step of encrypting predetermined data with the second encrypting key in said usage right control server to generate authorization data and transmitting such authorization data to said content processing apparatus;
   an authorization data returning step of decrypting said authorization data with the second decrypting key in said content processing apparatus and returning the decrypted data to said usage right control server; and
   a judgment step of judging a successful verification of an authorization for use of said user in case the decrypted data coincide with the predetermined data.

3. A content utilizing method according to claim 2, wherein the predetermined data include a random number.

4. A content utilizing method according to claim 3, wherein the predetermined data include identification information of the user or the content.

5. A content utilizing method according to claim 1, wherein the second encrypting key and the decrypting key are a same user key, and such user key is transmitted from said user terminal to said content server, then included in the ticket and transmitted to said content processing apparatus, and included in the license control information and transmitted to said usage right control server.

6. A content utilizing method according to claim 1, wherein the second encrypting key is a public key of the user, and the second decrypting key is a secret key corresponding to the public key.

7. A content utilizing method according to claim 1, wherein the authorization step includes:
   an authorization data transmitting step of generating predetermined authorization data in said usage right control server and transmitting such authorization data to said content processing apparatus;
   an authorization data returning step of encrypting the authorization data with the second encrypting key in said content processing apparatus and returning the encrypted data to said usage right control server; and
   a judgment step of decrypting the returned encrypted data with a second decrypting key and judging a successful verification of an authorization for use of the user in case the decrypted data coincide with the predetermined authorization data.

8. A content utilizing method according to claim 7, wherein the predetermined authorization data includes a random number.

9. A content utilizing method according to claim 1, wherein the condition of use includes a kind of processing of the content.

10. A content utilizing method according to claim 1, wherein the condition of use includes a fee charging method.

11. A content utilizing method according to claim 10, wherein the fee charging method includes a charging method according to an amount of use.

12. A content utilizing method according to claim 1, wherein in said license control information transmitting step, license control information including usage right information capable of describing plural usage rights is generated, and in said content processing step, a usage right is selected among the plural usage rights and the content is processed based on the selected usage right.

13. A content utilizing method according to claim 1, wherein the usage right information describes charge information for the execution of the usage right, and the method further comprises a charging step of executing a charging process according to the charging information when the usage right is executed.

14. A content utilizing method according to claim 13, further comprising a charge checking step of checking a charge prior to the execution of the usage right.

* * * * *